C. W. SURBER.
TENT.
APPLICATION FILED SEPT. 11, 1916.
1,238,360.
Patented Aug. 28, 1917.
3 SHEETS—SHEET 3.
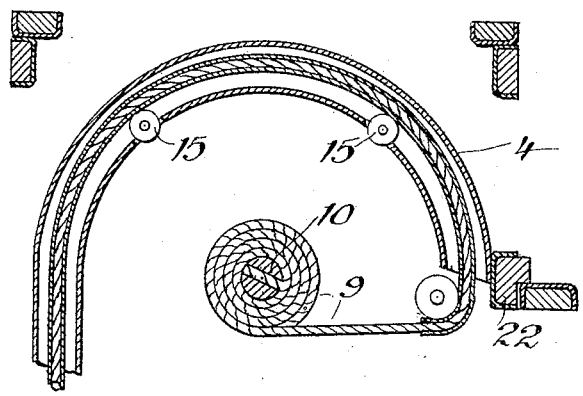
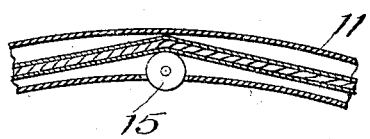
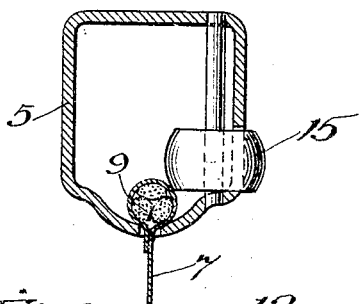
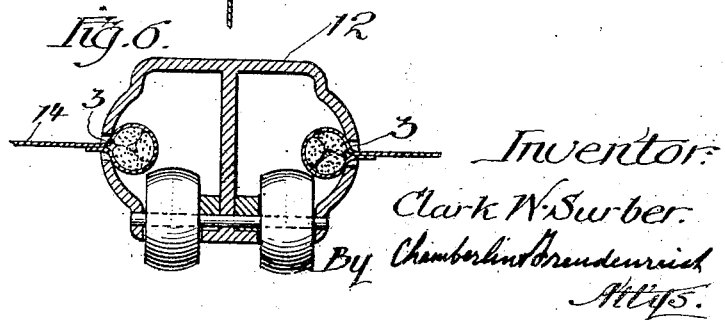
Inventor:
Clark W. Surber.
By Chamberlin & Brandenriech
Attys.

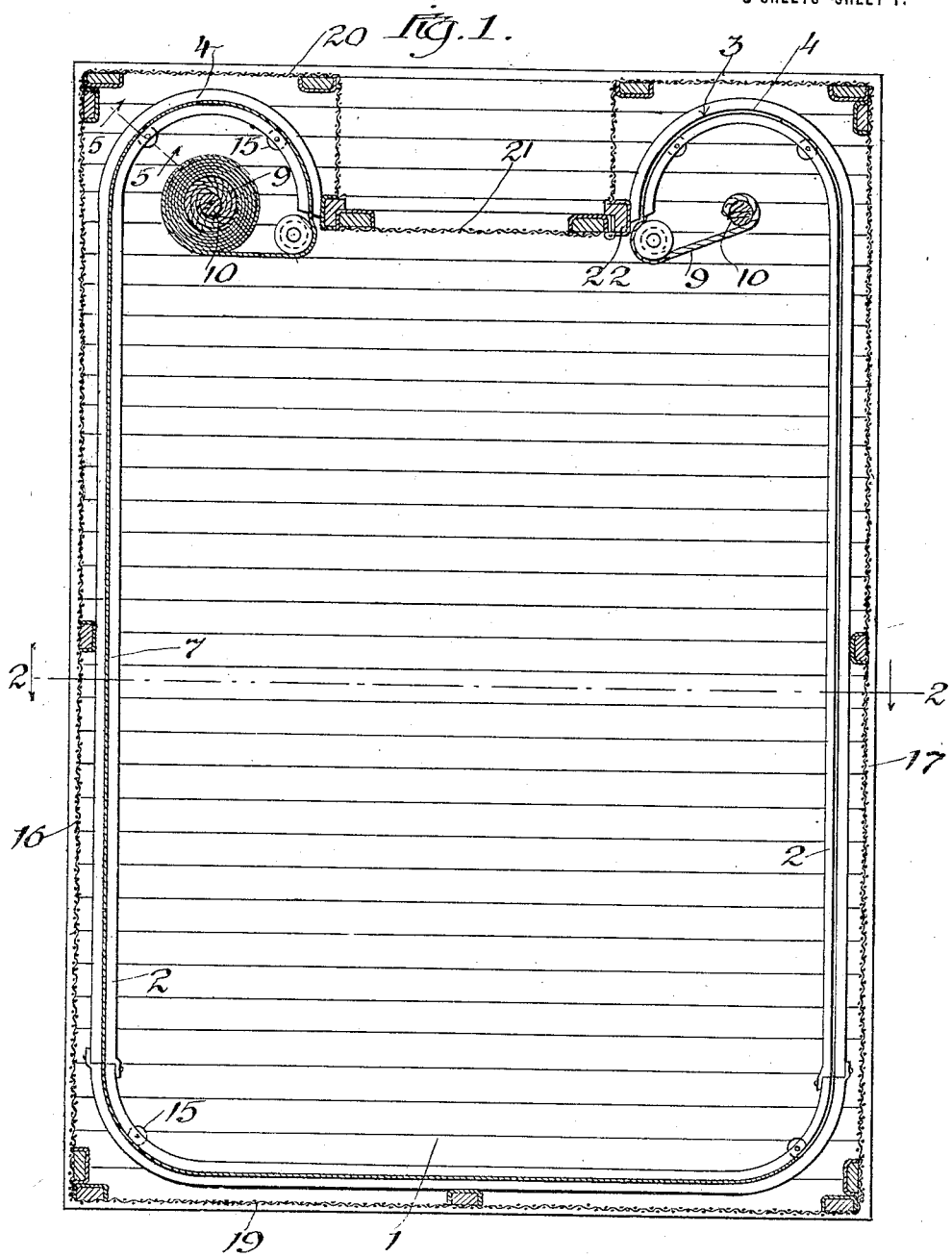

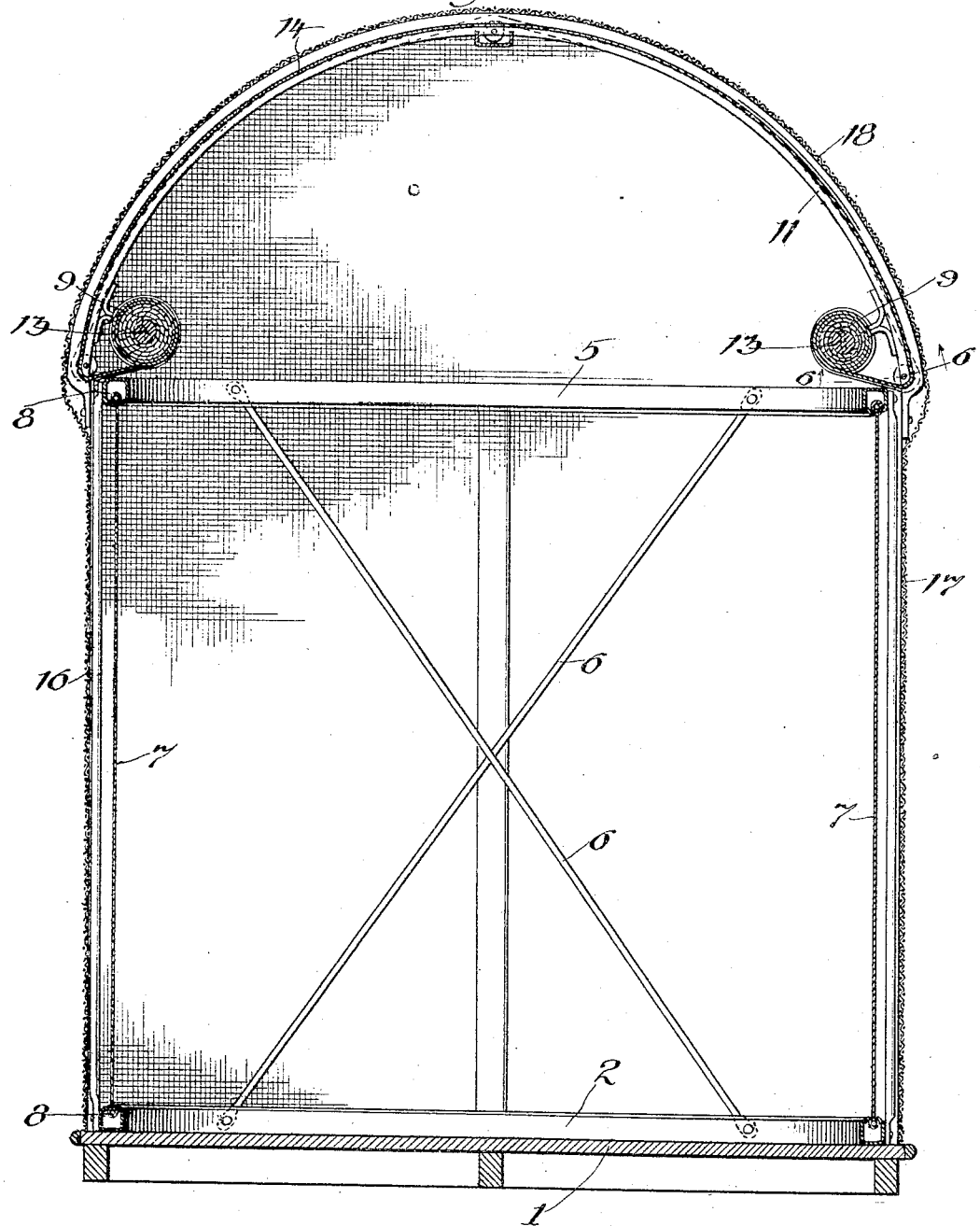

UNITED STATES PATENT OFFICE.

CLARK W. SURBER, OF CHICAGO, ILLINOIS.

TENT.

1,238,360.  Specification of Letters Patent.  Patented Aug. 28, 1917.

Application filed September 11, 1916. Serial No. 119,341.

*To all whom it may concern:*

Be it known that I, CLARK W. SURBER, a citizen of the United States, residing at Chicago, county of Cook, State of Illinois, have invented a certain new and useful Improvement in Tents, and declare the following to be a full, clear, and exact description of the same, such as will enable others skilled in the art to which it pertains to make and use the same, reference being had to the accompanying drawings, which form a part of this specification.

My invention has for its object to produce a simple and novel portable tent-like structure which shall be proof against flies and mosquitos while giving all of the advantages that the occupants would have out in the open air, and in which the occupants may shield themselves against wind, rain or sunlight coming from any direction.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a horizontal section taken through a structure arranged in accordance with a preferred form of my invention at some distance above the floor thereof;

Fig. 2 is a central vertical section taken approximately on line 2—2 of Fig. 1;

Fig. 3 is a horizontal section on an enlarged scale through the part shown in the upper left hand corner of Fig. 1, the floor being omitted;

Fig. 4 is a section on an enlarged scale on a plane parallel to the plane of Fig. 2 through one of the guideways at the extreme top of the structure;

Fig. 5 is a section on an enlarged scale taken approximately on line 5—5 of Fig. 1; and Fig. 6 is a section taken approximately on line 6—6 of Fig. 2.

Referring to the drawings, 1 represents a platform of any suitable size and shape, preferably rectangular, adapted to serve as the floor of my improved structure. On the floor is a hollow frame, 2, in the form of a tubular member having a slot, 3, extending from one end to the other at the top thereof. The member 2 extends along three of the sides of the structure and terminates in two curved ends, 4, at one end of the structure. The extremities of the members 4 nearest each other are far enough apart to provide a doorway between them.

At a suitable height above the member 2 is a similar member, 5, the slot therein being, however, directed downwardly. The members 2 and 5 may be held in their proper spaced relation to each other in any suitable way as, for example, by means of connecting braces, 6.

Between the members 2 and 5 is stretched a flexible wall, 7, preferably made of canvas or other suitable material employed in the manufacture of tents. The height of the wall is sufficient to permit its lower and upper ends to extend into the slots in the lower and upper frame member; a flexible beaded edge being placed along each edge and serving not only as a binding but also as a stop to prevent the corresponding edge of the wall from being withdrawn through the slot. In other words, the beads 8 are larger in diameter than the width of the slots through which the fabric passes. The beads may conveniently be formed by carrying the edge of the canvas around a cord or cable, 9, as best shown in Fig. 5. The length of the canvas may be equal to the length of the frame members so that it may be employed to cover the three sides of the structure and all of the fourth side except the doorway; or the canvas may be made shorter. The curved ends, 4, of the frame are preferably made arc-shaped and, at the axes thereof, I locate vertical rollers, 10, to which the ends of the fabric wall are connected and upon which the fabric may be wound and unwound as hereinafter explained. To each end of the canvas are attached cords or cables which may conveniently be mere extensions of the cables 9; and the ends of these cables are attached to the rollers and form the connections between the rollers and the canvas. By properly proportioning the lengths of the cables, the canvas may be rolled up from either end, causing its opposite end to be carried along the track-like members 2 and 5 so as to leave any desired portion of the sides of the structure uncovered. Thus, in Fig. 1 I have illustrated the cables at one end of the canvas and sufficient of the canvas wound up upon the left hand roller to leave one entire side of the structure uncovered. Obviously, the condition of the parts may be just reversed so that the left hand side, as viewed in Fig. 1, will be uncovered while the right hand side is covered.

The roof of the structure is formed by a plurality of curved frame-like members similar in cross section to the members 2 and 5, each being bent to form a transverse rib of a roof of any desired shape. I prefer to make the roof in at least two panels where the structure is of any considerable length, in order to prevent sagging of the canvas. In the arrangement shown the roof members are bent so as to form practically semi-circles; there being two single end members, 11, and a double central member, 12, (best shown in Fig. 6) all positioned so that the slots will extend laterally. Longitudinal rollers, 13, are placed just inside of the lower ends of the roof frames above the member 5 and panels, 14, of canvas or other similar material are placed between the central roof member and the two end members and are attached to the rollers, 13, in the same way that the wall 5 is attached to the rollers 10. With this arrangement the roof may be left open on one side or the other or be completely closed. In short, the structure may be made snug and tight against wind and rain or it may be left open at almost any desired point and over large areas of its walls and roof to admit air and light as conditions permit.

At the corners of the frames 2 and 5 and at the lower ends of the roof frames I prefer to place rollers, 15, which engage with the beads on the fabric and make the covering run freely when it is being wound or unwound. These features are, however, mere details which may be widely varied.

To make the structure proof against flies, mosquitos and the like, I inclose the entire structure heretofore described in a housing of wire netting. This may conveniently be accomplished by making two side panels, 16 and 17, connected at their upper ends by a top panel, 18; the top panel being laid upon the roof structure and the side panels extending down opposite sides to the floor. A separate end panel, 19, may be placed between the ends of the panels 16 and 17 at the end of the structure opposite the doorway, while a special panel, 20, containing a door, 21, may be placed at the other end of the structure; the panel, 20, including a door frame, 22, which fits between the ends 4 of the frame members 2 and 5.

While my invention is particularly applicable to portable tents and the only embodiment thereof illustrated in the drawings is such a tent, it will of course be understood that my invention may be used in many other situations in connection with a complete or a part of a building.

I claim:

1. A housing having a plurality of open sides, upper and lower guides extending along said sides, a flexible wall arranged between said guides and engaged thereto so as to be movable bodily along the same, and means for shifting said wall bodily in one direction or the other for the purpose of closing any desired part of said sides and leaving the remaining part uncovered.

2. A housing having a plurality of open sides, upper and lower guides extending along said sides, a flexible wall arranged between said guides and engaged therewith so as to be movable bodily along the same, and means for rolling said wall up from either end.

3. A housing having a plurality of open sides, upper and lower guides extending along said sides, a flexible wall arranged between said guides and engaged therewith so as to be movable bodily along the same, rollers at the terminals of said guides, and cables arranged between each end of said wall and the corresponding roller.

4. A protective housing erected above a floor or base, upper and lower guides parallel with said floor or base, a flexible wall arranged between said guides and engaged therewith so as to be movable bodily along the same, rollers at the ends of said guides for winding up said wall, and connections between said rollers and said wall, whereby said wall may be adjusted to provide an opening from the interior to the exterior of the housing at either end of the guides and of any desired width measured in the direction of the length of the guides.

5. In a structure of the character described, a framework, flexible panels connected to said framework so as to be shiftable from a position in which a closed room is provided to positions in which varying portions of the walls are left open, and a screen housing arranged over said framework and panels.

6. In a structure of the character described, a framework having a doorway, flexible panels connected to said framework so as to be shiftable from a position in which a closed room is provided to positions in which varying portions of the walls are left open, and a screen housing arranged over said framework and panels and having a door for said doorway.

7. In a structure of the character described, two similar hollow frame members lying one above the other and each having a slot extending lengthwise through the same in the side directed toward the other member, said frame members being shaped to extend along a plurality of sides of the structure, a flexible wall extending between said frame members and projecting at the top and bottom into said slots, there being a bead along the top and bottom edges of said wall to prevent it from becoming disengaged from said frame members.

8. In a structure of the character described, two similar hollow frame members lying one above the other and each having a slot extending lengthwise through the same in the side directed toward the other member, said frame members being shaped to extend along a plurality of sides of the structure, a flexible wall extending between said frame members and projecting at the top and bottom into said slots, there being a bead along the top and bottom edges of said wall to prevent it from becoming disengaged from said frame members, vertical rollers each arranged across corresponding ends of said frame members, and cables between said rollers and the ends of said wall.

9. In a structure of the character described, two frame members arranged one above and parallel with the other, each frame member being in the form of an almost complete closed figure with its ends curved inwardly and spaced apart from each other to form a doorway, a flexible wall extending between said frame members and attached thereto so as to be movable bodily along the same, vertical rollers at the axes of said curved ends, and connections between said rollers and said wall.

10. In a structure of the character described, two frame members arranged one above and parallel with the other, each frame member being in the form of an almost complete closed figure with its ends curved inwardly and spaced apart from each other to form a doorway, a flexible wall extending between said frame members and attached thereto so as to be movable bodily along the same, vertical rollers at the axes of said curved ends, and cables of considerable length between said rollers and the ends of said wall.

11. A protective housing for living beings having an opening in the wall, hollow parallel guides arranged at opposite sides of said opening, each guide having a slot extending lengthwise through the same in the side directed toward the other guide, a flexible panel extending between said guides and projecting at its edges through said slots, there being a bead at each of the aforesaid edges of the panel thicker than the width of said slots, and means for moving said panel along said guides to vary the area of said opening that is covered by the panel.

In testimony whereof, I sign this specification.

CLARK W. SURBER.

Copies of this patent may be obtained for five cents each, by addressing the "Commissioner of Patents, Washington, D. C."